(12) United States Patent
Simpson

(10) Patent No.: US 6,405,310 B1
(45) Date of Patent: Jun. 11, 2002

(54) SYSTEM AND METHOD FOR PERIPHERAL SYSTEM MANAGEMENT USING OPERATION OBJECT INTERFACES FOR DEVICE CONTROL

(75) Inventor: Shell S. Simpson, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/350,940

(22) Filed: Jul. 9, 1999

(51) Int. Cl.[7] .............................................. G06F 9/24
(52) U.S. Cl. ........................ 713/1; 713/100; 709/208; 709/220; 709/229; 710/8
(58) Field of Search ............................... 713/1, 2, 100; 709/220, 221, 222, 229, 208, 301, 303; 710/8, 10, 62, 104

(56) References Cited

U.S. PATENT DOCUMENTS

| | | | | |
|---|---|---|---|---|
| 5,566,346 A | * | 10/1996 | Anderf et al. | 710/8 |
| 5,710,925 A | * | 1/1998 | Leach et al. | 710/63 |
| 5,778,377 A | * | 7/1998 | Marlin et al. | 707/103 |
| 5,968,138 A | * | 10/1999 | Clough | 710/8 |
| 6,178,529 B1 | * | 1/2000 | Short et al. | 714/41 |
| 6,209,031 B1 | * | 3/2001 | Casey et al. | 709/222 |
| 6,223,223 B1 | * | 4/2001 | Kumpf et al. | 709/227 |

* cited by examiner

Primary Examiner—Jeffrey Gaffin
Assistant Examiner—RiJue Mai

(57) ABSTRACT

A method and memory device enabling a user at a management computer to invoke a function on one or more plural managed units of a peripheral system, each managed unit providing one or more services for one or more client computers. Each service has an associated managed entity (ME) interface that includes reference(s) to one or more management interfaces (MIs), each MI including one or more method(s) for controlling a managed unit to execute a desired action. The method responds to a user selecting an Operation object by (i) determining which MEs associated with the managed units support a designated MI object that will enable execution of the desired Operation, by invoking execution of one or more management interface provider objects on each managed unit to return an answer (ii) passing the list of determined MEs to an Operate method of the Operation object whose task is to perform the desired action by invoking methods on the designated MI(s) associated with one or more of the managed units; and (iii) executing the Operate method to initiate execution, in a managed unit associated with the one or more listed MEs, of said designated management interface object (or objects) which, in turn, cause performance of the desired action by the managed unit.

20 Claims, 7 Drawing Sheets

THE "OPERATE" METHOD OF THE "ONLINE MANAGEMENT OPERATION" OBJECT, FOR EACH MANAGED ENTITY, CALLS AN "ONLINE ( )" METHOD TO SET THE APPROPRIATE ONLINE STATE OF THE MANAGED UNIT, IN ACCORS WITH A VALUE OF THE MEMBER VARIABLE SET BY THE USER.

SYSTEM AND METHOD FOR PERIPHERAL SYSTEM MANAGEMENT USING OPERATION OBJECT INTERFACES FOR DEVICE CONTROL

FIELD OF THE INVENTION

This invention relates to the management of peripheral systems and, more particularly, to a system and method for peripheral system management which utilizes Operation objects to invoke operations on peripheral devices.

BACKGROUND OF THE INVENTION

Managing a peripheral system involves configuring devices making up the peripheral system, obtaining their status, causing the devices to perform desired functions and receiving "events" from the devices. The capabilities of the devices vary widely and communication protocols used to interact with the devices also vary widely. Software that manages a peripheral system must accommodate this variety and as a result, is often quite complex. A peripheral system, as the term is used hereafter, includes printers, scanners, servers, multi-function devices and peripheral clients such as personal computers.

Vendors constantly ship new models of peripheral devices, peripheral servers and peripheral clients which present further challenges to developers of peripheral systems management software systems. Such software must be constantly revised to support such new devices and new device features, further increasing the complexity of such software.

The capabilities provided by peripherals, peripheral servers and peripheral clients vary, based on their respective configurations. As resources, such as hard disks, are added or removed, peripheral system management must handle these capability changes—further increasing complexity of the peripheral system management software.

Peripheral system management (PSM) applications often allow end-users to perform operations on a collection of devices using a single command, as opposed to issuing a same command over and over for each device. For example, PSM applications allow a collection of devices to have their addresses reassigned through use of a single command, but such applications do not accommodate new capabilities on such devices.

PSM applications also typically display user interface elements that represent a collection of devices being managed. Through this interface, the user can perform management activities on several devices at the same time. Generally, this interface is non-extensible and does not provide the capability to significantly change the way a PSM application displays multiple devices. By contrast, PSM applications allow device designers to contribute "applet" extensions (i.e., small programs that run in the context of a larger program) that customize how a device is supported. When a user indicates a desire to manage an individual device, the applet is used to present a device-specific user interface to the user.

In many computers, a dynamic link library (DLL) is used to store a collection of subroutines. Those subroutines can be called when needed by a larger program that is running and used as a "plug-in". Such subroutines are often used to let the larger program communicate with a specific device such as a printer or scanner. The advantage of a DLL file is that it doesn't become loaded into random access memory (RAM) until called by the larger program. A DLL file is dynamically linked with the program that uses it during execution, rather than being compiled with the main program. Also, a DLL can be shared by multiple programs.

There is a need for a peripheral system management system that is capable of interacting with multiple types of devices in the peripheral system; that can act on groups of devices that provide the same capabilities; and that can accommodate changes to the manner in which groups of devices are operated.

SUMMARY OF THE INVENTION

A method and memory device enabling a user at a management computer to invoke a function on one or more plural managed units of a peripheral system, each managed unit providing one or more services for one or more client computers. Each service has an associated managed entity (ME) interface that includes reference(s) to one or more management interfaces (MIs), each MI including one or more method(s) for controlling a managed unit to execute a desired action. The method responds to a user selecting an Operation object by (i) determining which MEs associated with the managed units support a designated MI object that will enable execution of the desired Operation, by invoking execution of one or more management interface provider objects on each managed unit to return an answer (ii) passing the list of determined MEs to an Operate method of the Operation object whose task is to perform the desired action by invoking methods on the designated MI(s) associated with one or more of the managed units (22,24); and (iii) executing the operate method to initiate execution, in a managed unit associated with the one or more listed MEs, of said designated management interface object (or objects) which, in turn, cause performance of the desired action by the managed unit.

BRIEF DESCRIPTION OF THE DRAWINGS

FIGS. 6–8 comprise a logical flow diagram of an example of the method of the invention.

DETAILED DESCRIPTION OF THE INVENTION

Figure 1:
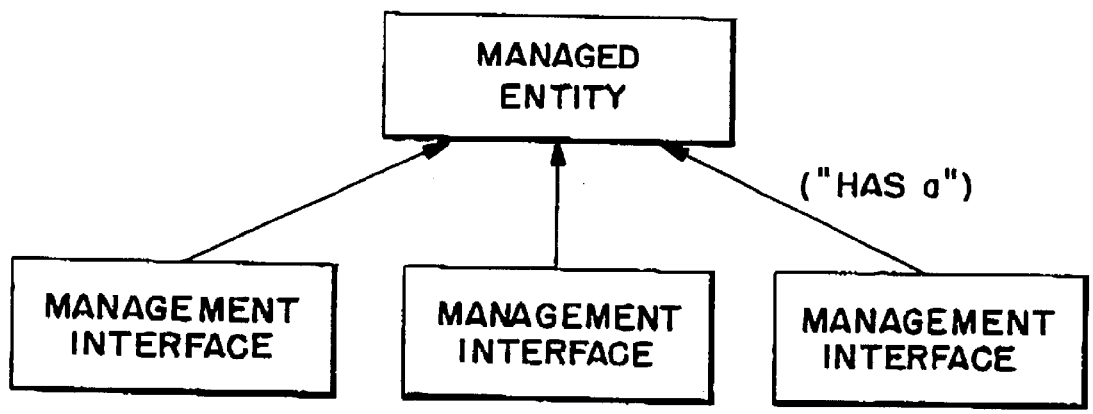
FIG. 1 is a schematic representation of a typical ME data structure.

Network software must interact with physical devices that are connected to the network. In the past this has been accomplished by describing a physical topology and assigning each machine a name. However, since physical topologies vary from site to site, software deployed at many locations cannot be described in this way. This invention, rather than specifying particular machines, uses a logical topology that describes the roles (or services) that machines play/provide.

Examples of roles that machines play in peripheral system management (PSM) software embodying the invention are given below:

Management Client Machine: the role of a machine that presents a user interface for PSM software. For example, the role of management client is performed by whatever machine runs a web browser that is used to access a network administration program.

Management Server Machine: the role of a machine that provides logic for PSM software. For example, the server machine on which a network administration program is installed performs the role of a management server machine.

Peripheral Client Machine: the role of a machine making use of services provided by a peripheral. An end-user workstation making use of a printer is an example of a peripheral client machine.

Peripheral Server Machine: the role of a machine mediating access to the services provided by a peripheral device. A Windows NT (a trademark of the Microsoft Corporation) machine that shares its printers is an example of a peripheral server machine.

Peripheral Machine: the role of a machine that serves as a peripheral. Printers and scanners are examples of peripheral devices.

Peripheral Directory Machine: the role of a machine that provides a service used to find peripheral machines and peripheral server machines.

Note that one physical machine can perform multiple roles and provide multiple services. For instance, a central server can serve as both a management server machine (a machine where a network administration program is installed) and a peripheral server machine (e.g., a print server).

The peripheral management software that incorporates the invention is able to discover, organize, display, modify and monitor MEs related to peripherals. An ME is a software object through which the role of a device and a service the device provides can be managed. To re-emphasize, a single device may have plural roles and thus be associated with plural MEs.

An ME is an architectural abstraction used to model a thing being managed.

MEs are discovered by an Explorer architectural abstraction.

MEs are organized by a Database architectural abstraction.

MEs are displayed by a View architectural abstraction.

MEs are modified by an Operation architectural abstraction.

As will be understood from the following discussion, each of the abstractions identified above is configured as a software object that, in the classical sense, maintains its state in "variables" and implements its behavior with one or more methods. The various objects to be described below provide the PSM software incorporating the invention with substantial flexibility to accommodate system and software modifications.

It is often necessary for a user to cause one or more peripheral devices to execute a desired operation related to either the device as a whole or with respect to a role played by the device. Plug-ins are known in the prior art and, as described above, comprise subroutines that, for example, are incorporated into a Dynamic Linked Library (i.e., for a system using the Windows operating system, "Windows" is a trademark of the Microsoft Corporation). When such a plug-in DLL is then loaded, the included subroutines become executable by the operating system. But the prior art has not had plug-ins that would operate across many types of peripheral devices unless all were configured with special purpose and matching software interfaces.

As will hereafter become apparent, the invention incorporates an Operation object that preferably functions in the form of a plug-in, but is adapted to interface with any ME that includes a management interface required by the Operation object. It is to be understood that the invention can also be configured so that the Operation object is incorporated into an application, rather than being configured as a plug-in.

An Operation object enables a user, via a display interface, to cause one or more peripheral devices to execute an embedded MI object (or an associated MI object) to perform a desired operation. The Operation object performs the desired action so long as the peripheral devices are associated with an MI that will execute the desired operation. Assuming that support for the required MI is present on a peripheral device, execution of the Operation object causes the MI on the peripheral device to execute and carry out one or more methods incorporated therein. The result of such execution is that the peripheral device performs the desired action.

Before describing an example of the functions of an Operation object, the various software constructs that render the invention operable will be described.

Managed Entities

Definition

An ME is an object that represents a user recognizable element in the peripheral management problem domain. An ME provides a collection of one or more management interfaces (MIs). An MI is a set of one or more functions used to interact with (or identify) an ME.

A user responsible for managing printers recognizes the existence of printers, print servers, and print clients. With or without PSM software, this user will interact with each of these elements in order to solve problems. This same user will probably not be aware of the detailed architecture of a spooler. The existence of a port monitor or print processor will in all likelihood be irrelevant to such a user. In solving problems, this user is concerned only with those elements that are familiar. These familiar and easily recognized elements are the basic unit of management that users expect to find in PSM software. The objects representing these basic units of management are called MEs.

Each of these basic units of management is subdivided into additional elements. For example, a print server is made up of a spooler which is made up of still more elements, like drivers, port monitors, and print processors. Although each of these elements may need to be managed, they are typically managed in the context of managing the print server. A user upgrades the driver on a particular print server by interacting with the print server.

The collection of MIs provided by an ME is extensible. For example, a printer can provide an interface for managing features of the printer (i.e. adding, removing) even if this interface hadn't been conceived previously in PSM software. In order to use an interface, Operation and View objects (to be described below) are provided.

The collection of MIs provided by an ME is also dynamic. At runtime, the collection of MIs can be modified. As resources available to an ME change, the MIs provided by that ME can change. For example, a printer may or may not have a hard disk. Since the presence of a hard disk determines whether or not it is possible to manage mass storage fonts, the MI relating to management of mass storage fonts is not provided if a hard disk is not available.

MIs (and the functions they comprise) supported by a particular ME can be queried at runtime. An application querying the MIs doesn't necessarily have to know how to use them. The application can, instead, simply keep track of which MIs each ME provides and use this information to match MIs with components that do understand these interfaces. For example, an application that knows nothing about the MI used to manage fonts could match an Operation requiring the font management interface with MEs that supply that interface.

Management Interfaces

Normally, an object has a single, static interface. However, having only one interface means that the interface must be revised each time the capabilities of the object are changed. Having multiple revisions of the same interface leads to confusion. This is avoided in this invention by assuring that an ME with multiple interfaces is represented by an one or more objects, each called a Management Interface (MI). An MI comprises one or more methods for interfacing with a specific capability of the ME. Accordingly, other individual objects can reuse these MIs. Further, these MIs can come and go at runtime—without recompilation.

The granularity of MIs is a design decision that doesn't effect their usefulness. An MI can include a large set of unrelated functions or a small set of closely related functions. For example, an MI called NewLaserJet can be defined that includes functions for features found in all new LaserJet printers (LaserJet is a trademark of the Hewlett-Packard Company). The same set of functions can also be placed into several MIs related to specific features, such as "ChangeOnlineState" and "PrintTestPage". It is also possible to support both finer and coarser granularity interfaces by using multiple inheritance to compose coarse interfaces from several fine interfaces. Using coarse grain interfaces requires less code, but fine grain interfaces typically are easier to understand and provide greater extensibility.

FIG. 1 illustrates a typical ME object with references to MIs that enable retrieval of feature information of the device that provides the role represented by the ME. Each MI contains one or more functions, some of which may enable retrieval of information from the device and others of which may enable the associated device to perform a function. Again, it is to be recalled that the ME corresponds to a role performed by a device, and not necessarily to the device as a whole—unless the device only performs one role.

Figure 2:
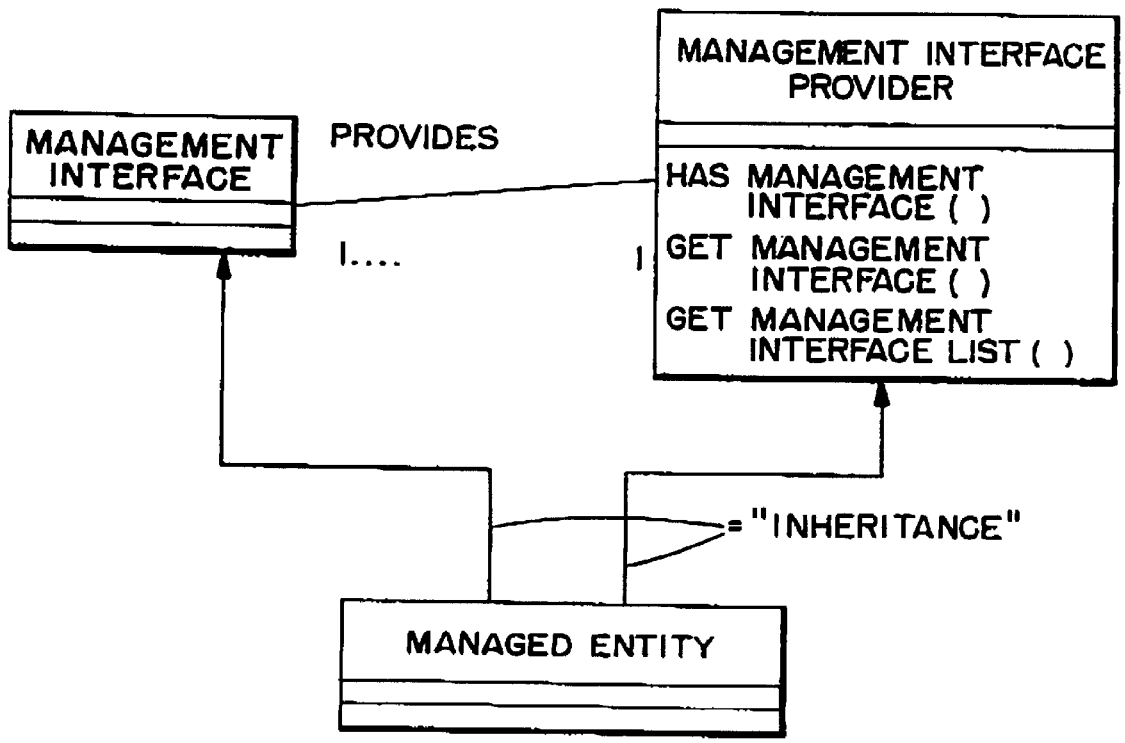
FIG. 2 is a unified modeling language representation of the relationships between an ME class and an MI class, showing that the ME is a subclass of the MI.

The inheritance diagram of FIG. 2 is a unified modeling language diagram that shows how MIs relate to MEs. The arrows which connect the ME box to the MI and ManagementInterfaceProvider boxes denote inheritance. More specifically, inheritance dictates that when a program is compiled, the ME object implements all methods of the inherited interfaces. ME objects are both providers of MIs and are themselves MIs.

The Management Interface Provider object shown in FIG. 2 includes three functions that are utilized by the PSM software. The "Has Management Interface()" function determines whether an ME can return a pointer to a specified MI. The "Get Management Interface()" function returns an MI to be utilized to retrieve information regarding an associated ME or to have the ME perform some function. The "Get Management Interface List()" function returns a list of associated MIs.

Figure 3:
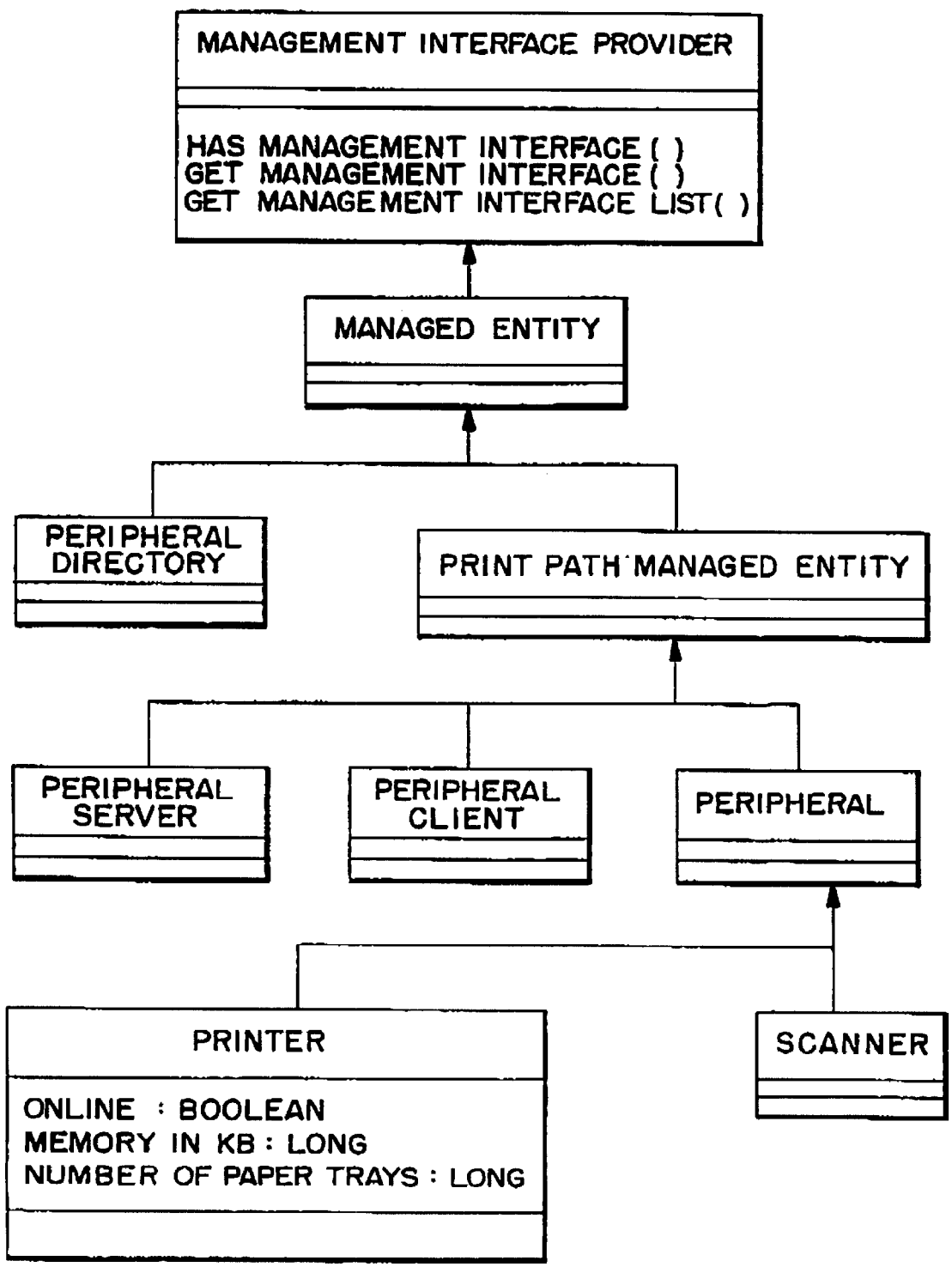
FIG. 3 illustrates different kinds of MEs.

FIG. 3 elaborates the different kinds of MEs. Peripherals, Peripheral Servers, and Peripheral Clients that are derived from PrintPathManagedEntity to identify their common relationship of being part of the print path. FIG. 3 is not intended to be complete. It is possible to have other types of MEs. For example, a printer can have a third party add-on output bin that folds pages and stuffs them in envelopes. Such a device can be an ME distinct from the ME representing the printer.

MIs can be derived from other MIs. When a derived MI is supported by an ME, that ME should support the parent MIs of that derived MI. Since most component technologies support interface inheritance, providing parent interfaces is usually trivial.

Figure 4:
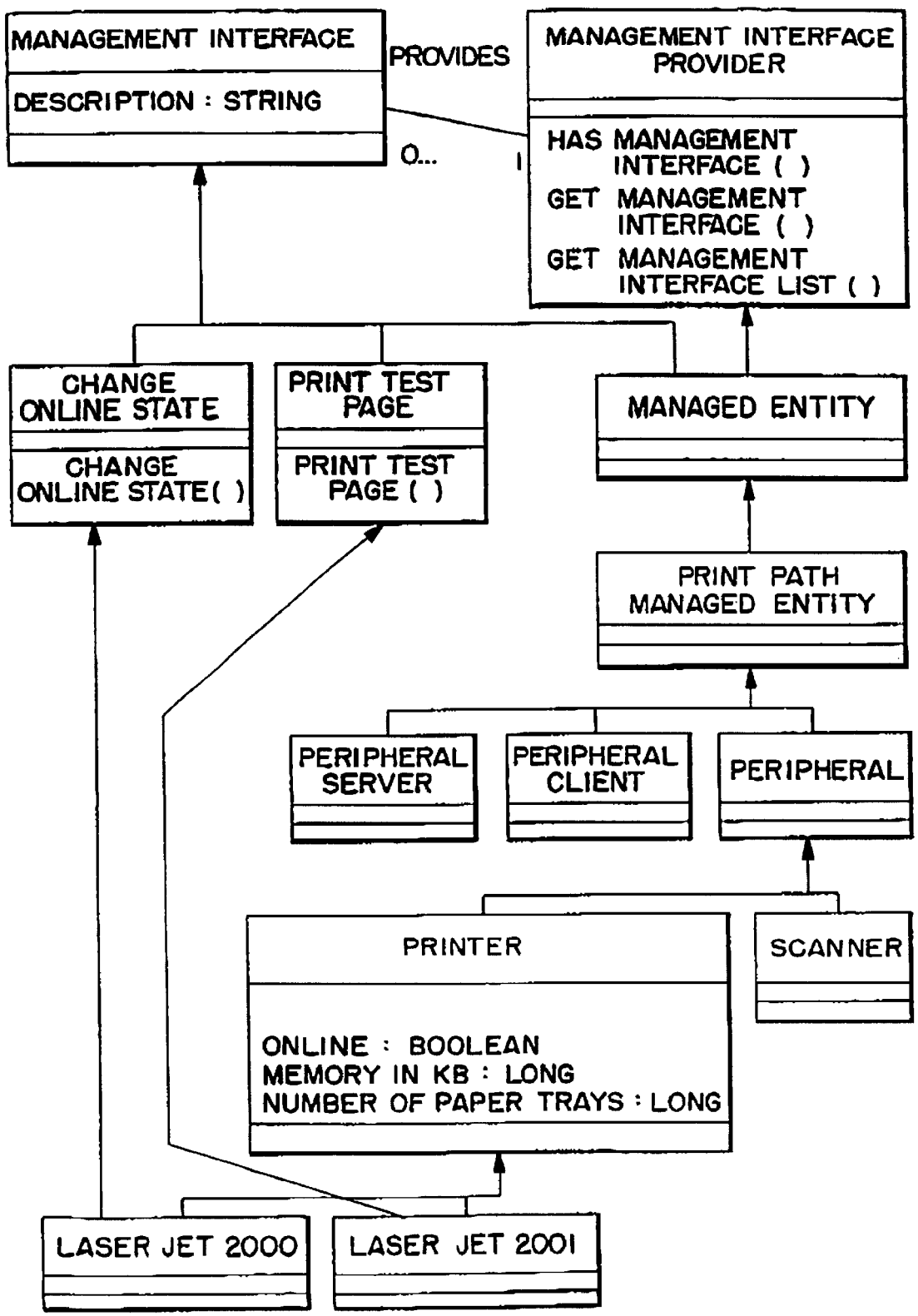
FIG. 4 illustrates an example of the derivation of ME classes and further shows two MIs that are not also MEs. It also illustrates how multiple inheritance can be used by an ME.

FIG. 4 provides an example of how exemplary managed entity classes are derived. FIG. 4 contains two management interfaces that are not also MEs: ChangeOnlineState and PrintTestPage. LaserJet2000 and LaserJet2001 do not necessarily need to be defined as unique MEs. They can simply be defined as printer MEs and provide whatever other MIs are supported.

Location of MEs

An ME object can located in one of three places:

Embedded within the machine it represents (as will be described in an example below);

Located in a machine directly connected to the machine it represents;

Located within a management server machine.

The major advantage of embedding ME objects is the elimination of the dependency on existing protocols. If an ME object is embedded in a device, it can interact with that device in a device specific manner. Since it isn't practical to retrofit all existing peripherals with embedded ME objects, ME objects can be located on a management server machine and can communicate using existing protocols. This is the major advantage of locating objects within a management server machine. The major advantage of locating MEs on directly connected machines is to overcome situations where a peripheral is not connected to a network. Since distributed component technology requires network connectivity, an ME on the directly connected machine must proxy for a network-inaccessible, direct connected device.

The location of an ME may change over time. Consider a peripheral with an embedded ME that has not been configured with an IP address. Without an IP address (or some other networking protocol support), it is not possible to communicate with the embedded ME. To accommodate this situation, a proxy ME on the management server machine can be created. This proxy ME won't support all the interfaces provided by the embedded ME, but it will support the interface that allows the IP address to be set. After the IP address has been set, the embedded ME will supercede the ME proxy located on the management server machine. The Database and Explorer abstractions (described below) are responsible for creating and replacing MEs.

Explorers

Definition

An Explorer is an object that discovers devices corresponding to MEs, creates MEs corresponding to these devices (if necessary), and delivers ME references to a Database used to track them.

Explorers have state and can be configured.

Operations and Views (described below) do not directly interact with devices. Instead, they interact with another object: e.g., an ME. This frees the object from knowing the specifics of how to communicate with a particular device, as the various implementations of the ME abstraction encapsulate this knowledge. MEs are either embedded in the device they represent or are located on some other machine (i.e. proxies). Embedded MEs are instantiated when the device in which they reside (and represent) is booted. Non-embedded MEs do not exist until the device they represent is discovered. When this occurs, the appropriate type of ME is instantiated. (The appropriate type is determined by querying the device during discovery.)

Different Explorers are provided to discover different MEs, i.e., one for MEs that perform a printer role, one for MEs that perform a scanner role, etc. Explorers simply discover devices, create MEs if necessary, and hand off the ME to a Database abstraction (discussed below). There are several hundred types of devices that correspond to MEs and more are being added each year. To address this, an Explorer may use a table that maps device types to an ME creation procedure to determine how to create an ME corresponding to a particular device type. Because MEs encapsulate the mechanism for communication, different types of MEs can be created depending on how a particular type of device is connected. For example, a direct connected laser printer. can be represented by a different type of ME than a laser printer connected through a network. Since a different type of Explorer is used to discover direct-connected devices than will discover network devices, the Explorer will utilize a different ME creation procedure to construct the ME.

Although the above has discussed a specific method for instantiating MEs, it is important to note that the methods described above are just an example of how MEs can be instantiated. Each Explorer is free to implement its own mechanism of instantiating MEs. In fact, when discovering pre-existing MEs (e.g., embedded within the device), an Explorer will not instantiate MEs at all (since they were already instantiated when the device booted).

Examples of Explorers

LocalIPSubnet Explorer

Often devices of greatest concern are those devices located on a local subnet. These devices can be discovered by a network administration program, but instead of generating records for the program Database, an ME of the appropriate type is created.

DirectConnect Explorer

An Explorer can be created that examines all local ports for direct-connected devices and based on its findings, creates the appropriate type of MEs to proxy for direct connected devices.

Server Explorer

An Explorer can be created that "discovers" the MEs from a server. Such an Explorer is used in environments where a server that routinely performs discovery already exists. This can be used to reduce network traffic and to increase performance.

Managed Entity Explorers

It is not appropriate to discover every ME on a network. Many MEs will be proxies located on the management server and be intended to be used only for the management application on that management server. Others, however, may be embedded within a peripheral with the intention that these MEs will be used by remote peripheral management software. PSM software can discover those MEs that it is appropriate to discover without discovering MEs that are not appropriate to discover by using an already existing naming service, e.g., a CORBA naming service (Common Object Request Broker Architecture). Since MEs themselves know whether or not they should be accessed externally, they can register with the naming service, allowing them to be located remotely. This solution may require that a single naming service be established on the network. Another solution is to discover devices using another protocol (e.g., SNMP or Simple Network Management Protocol)and to use an attribute of the protocol to identify the device's embedded ME. Although each underlying protocol requires a different Explorer to assist in the discovery of embedded MEs, the provision of a naming service could be avoided.

Databases

Definition

A Database is an object that accepts MEs, handles duplicates, and stores MEs for later availability.

A Database can also be cleared of a particular ME or all MEs.

The Database abstraction allows other architectural abstractions (such as Explorers) to interact with many types of Databases without knowing the specific type of Database. An application, which is aware of the specific type of Database in use, is still free to use the full functionality of whatever underlying Database management system is used. The intent of the Database abstraction is to provide an object that Explorers can interact with and that enables communication with the application's storage mechanism.

EXAMPLES

File-Based Database

For some applications, simply having a file containing a list of the MEs might be acceptable. A file-based Database can be created by implementing the interface specified for the Database abstraction (add, removeOne, removeAll) so that information related to MEs is recorded in a file. When a ME is added to the Database, a line might be added to the file with the information required by the application as well as information required to uniquely identify the ME (to support removeOne and handling duplication).

Object-Oriented Database

For some applications, the flexibility that is provided by an object-oriented Database may be attractive. Such a Database can be implemented similar to that implemented for File-Based Database (only on top of an object-oriented Database).

Relational Database

For applications that require Database performance, it may be attractive to use a relational Database. Such a Database can be implemented similar to that implemented for File-Based Database (only on top of a relational Database).

Views

Definition

A View is an object that displays a collection of MEs using MIs. Each ME in the collection being displayed must support the MIs required by the View. Views have state and can be configured.

A View is much like an Operation, except instead of operating on the supplied MEs, the MEs are displayed. A View can be broken into three parts: state, configuration, and display. The state keeps track of the current configuration and does not have a user interface. The configuration is similar to a configuration applet for an Operation. It is responsible for presenting a user interface that allows the state to be modified. The display is responsible for displaying a collection of MEs. The order of MEs may or may not be important depending on the View. Some Views may ignore the order of MEs in a collection and simply display the top three "interesting" MEs (and summarize the rest).

Others might display all MEs in the order provided in the collection. More than one instance of a View can exist at the same time, with a different state.

EXAMPLES

Consumables View

It is costly when a printer runs out of toner. Because users are often untrained, changing a toner cartridge takes longer than if a technician replaced the cartridge. Untrained users can also accidentally damage the printer. To address this problem, it is useful to have a means of finding out which printers are almost out of toner, so the toner can be replaced before it is exhausted. This is accomplished using a View. Such a View displays printers below a certain toner threshold, ordered from least to most amount of toner. By changing the low toner threshold, the user can vary the number of printers displayed. All printers are displayed if the low toner threshold is set to 100%.

Scanner View

This View displays MEs of a specific type. A View can be created for printers and would show the maximum number of pages per minute that the printer could deliver. A View for scanners can have a field indicating whether the scanner supports color. Accordingly, Views can be created to support specific types of MEs and display fields that make sense for that type.

Map View

A View can be constructed that, having been configured with a map, displays MEs according to their location on the map. The location of MEs is derived from a location file that includes the state of the map View. Since Views have a state, that state can be used to store information resulting from interactions between the user and the View.

Operations

Definition

An Operation is an object that operates upon a collection of MEs using MIs. Each ME in the collection being operated upon must support the MIs required by the Operation. Operations have state and can be configured.

As new MIs are defined, new Operations can be defined that use those MIs. PSM applications can simply support Operations in general—without specific knowledge of a particular Operation. An Operation requires certain MIs from the MEs it operates on. An Operation can require more than one MI, but requires at least one.

Depending on the Operation, the order of the MEs in a collection may or may not be significant. For example, the order is significant for an Operation used to assign IP addresses to a collection of MEs. But, the order is unimportant for an Operation used to upgrade firmware.

Operations may or may not be configurable depending on the Operation. An Operation that simply changes the state to online does not require any configuration. For Operations that are configurable, an applet is provided that knows how to configure that type of Operation. An applet is responsible for providing a user interface that allows a state to be modified. Such an applet will execute on the management client machine and configure the Operation by invoking methods. In a preferred implementation, the applet is written in Java.

EXAMPLES

Online Operation

Recall the ChangeOnlineState MI shown in the class hierarchy diagram of FIG. 4. This MI allows the online state of an ME supporting this MI to be changed. An Operation is built that uses the ChangeOnlineState MI to ensure that the online state is online. The online Operation is usable for building a management application that periodically restores all printers to online.

InstallFont Operation

Consider the following interface used to manage true type fonts:

interface TrueTypeFontManagement:

Management Interface

```
{
    void Add( Font f);
    void FontList List( );
    void Remove(FontListElement f);
};
```

Now, consider a peripheral systems management application that installs fonts on end-user machines (e.g., PCs) and printers. Such an application can be constructed using an Operation that installs a font on a machine supporting the TrueTypeFontManagement interface. The application simply identifies all the MEs supporting the TrueTypeFontManagement interface, configures the InstallFont Operation with the desired font file, and invokes the Operation on the MEs identified earlier.

AssignSequentialNetworkAddresses Operation

When changing a physical network from one subnet to another, it is necessary to renumber all the devices on the physical network. Network administration programs support mechanisms for reassigning network addresses sequentially to all the devices (managed by those applications) on the physical network. This can be accomplished using an Operation. Such an Operation is configured with a range of network addresses. The peripherals to renumber are then selected by the application (with or without user intervention depending on the application). Finally, the AssignSequentialNetworkAddresses Operation is invoked on the previously selected collection of peripheral MEs.

System Configuration

Figure 5:
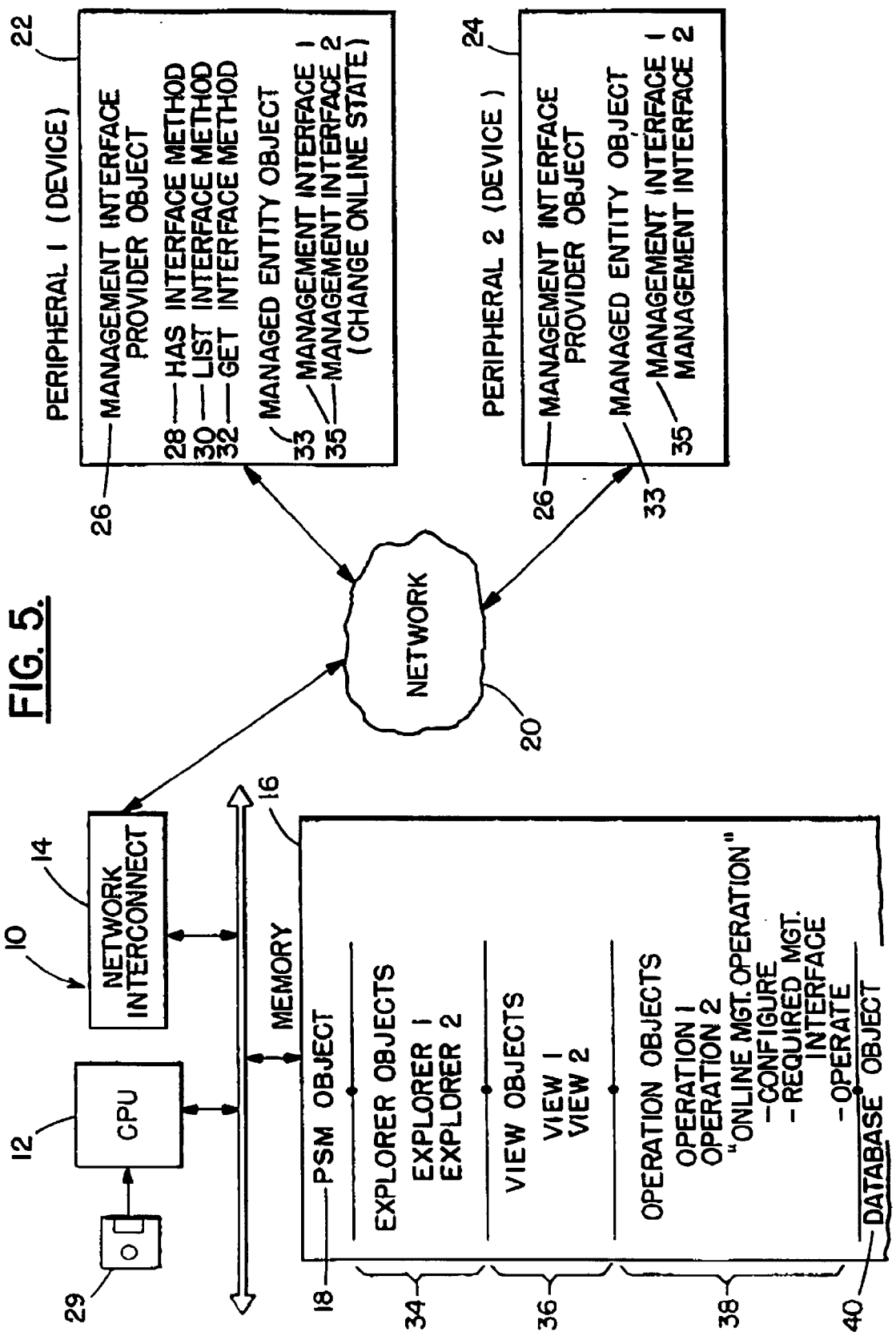
FIG. 5 is a block diagram of a system for performing the method of the invention.
Figure 6:
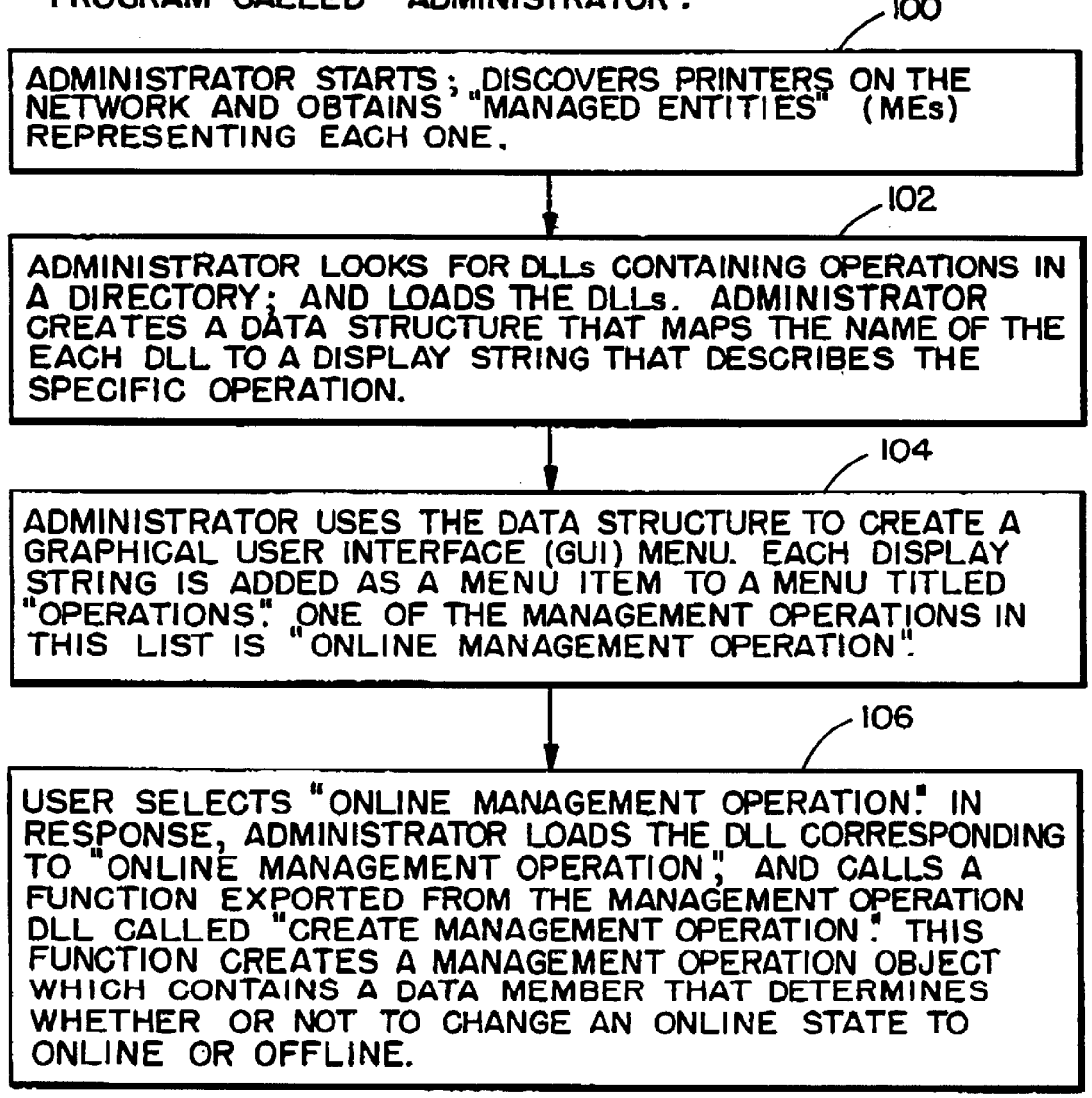
Figure 7:
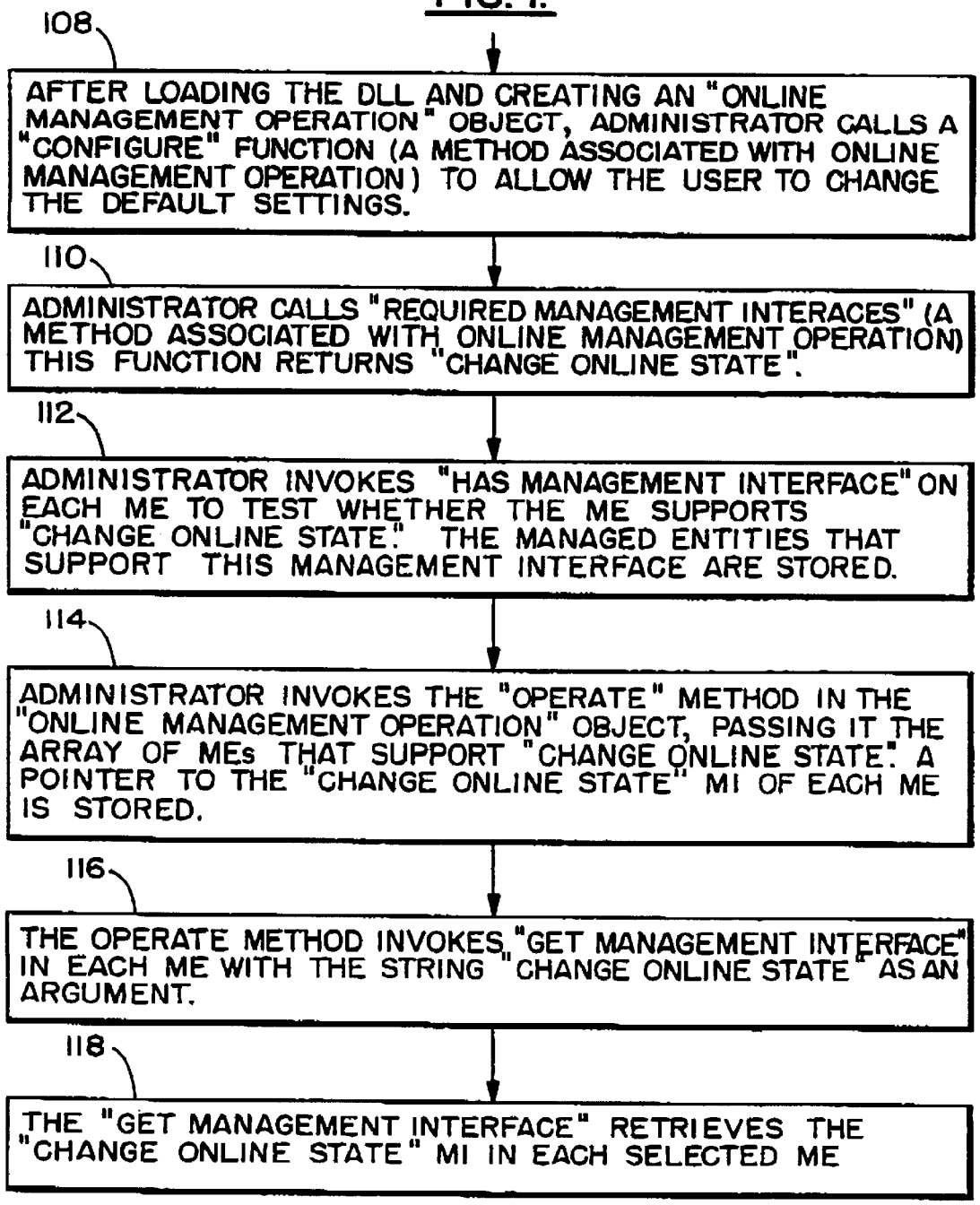

Referring to FIG. 5, a system for implementing the invention is illustrated. Client computer 10 includes a central processing unit (CPU) 12, a network interconnect module 14 and a memory 16 that holds a PSM object 18. PSM object 18 includes the necessary code to utilize the various objects that have been described above in order to manage plural peripheral devices that are accessible through network 20.

Each of peripheral devices 22 and 24 includes a Management Interface Provider object 26 which, in turn, enables access to "has interface method" 28, "list interface method" 30 and "get interface method" 32. Each peripheral device further includes one or more embedded ME objects 33, each enabling reference to one or more MIs 35 that enable retrieval of information regarding a respective peripheral device role and further include one or more methods for causing the peripheral device to perform a function. As will be discussed below, one MI 35 (i.e., MI2) includes a method called "change online state". That method enables a peripheral device to be remotely controlled to either assume an online or an offline state. As will be recalled, each MI 35 is an object that includes at least one function whose execution enables the peripheral device to perform a method with respect to a role performed by the respective peripheral device.

Hereafter it will be assumed that all objects are already loaded into memory and are ready for use. However, it is within the scope of this invention to provide such objects on one or more data storage devices, such as magnetic disk 29, the contents of which can be loaded into memory on an as-needed basis.

Memory 16 further includes one or more Explorer objects 34, each of which contains a method for obtaining references to ME objects; View objects 36 which enable the viewing of one or more selected MEs, their states and configurations (as described above); Operations objects 38 which operate upon a collection of MEs using MIs (as described above); and a Database object 40 (as described above). In the example below, it is assumed that one of Operation objects 38 is called "Online Management Operation" and includes the following methods: Configure, Required Management Interface(s) and Operate, the functions of which will be described in detail below.

Example Operation Application: "Online Management Operation"

This example demonstrates the use of a Management Operation to bring a group of network printers online. Printers can be in an "online" mode or an "offline" mode. When in offline mode, a printer cannot be used to print. It is not uncommon for a user to change a network printer from online mode to offline mode—and then forget to restore the printer to the online mode. In this example, a single user action enables a group of printers to be brought to an online state. The application used in this example is a network administration program called Administrator The Management Operation object responsible for changing the state of a printer to "online" is called "Online Management Operation". In this example, Administrator utilizes Online Management Operation to bring a group of printers (represented by MEs) to the online state. The steps of the example are as follows:

1) Administrator starts (Step 100). Through any of a variety of mechanisms, Administrator discovers. printers on the network and obtains MEs representing each one. For simplicity, it will be assumed that all of the printers on the network contain embedded MEs. The references to the embedded MEs are stored 2) Administrator looks in a directory containing Operations for DLLs (step 102). Administrator loads each DLL, calls a DLL entry point called "GetMenuName" which returns a display string that describes the DLL contents, then unloads the DLL. Administrator creates a data structure that maps the name of the DLL to the name of the display string. This data structure can be any suitable conventional data structure such as a table. Administrator uses this data structure to modify a Graphical User Interface (GUI) menu (step 104). Each display string is added as a menu item to a menu titled "Operations". One of the management operations in the list is "Online Management Operation".

3) User selects Online Management Operation (Step 106). In response, Administrator loads the DLL corresponding to Online Management Operation, and calls a function exported from the management Operation DLL called "CreateManagementOperation". This function creates a management Operation object. The data members of the object are dependent on the particular type of management operation. In this example, the "Online Management Operation" contains a data member that determines whether or not to change an online state to online or offline.

The member functions are determined by the object type. In this case, the object type is Management Operation. A Management Operation has a number of functions:

Configure(HANDLE hParentWindow)—This function accepts a handle to a parent window and displays a dialog string that allows the user to configure the internal state of a Management Operation object. In the case of the Online Management Operation object, a dialog box is displayed that shows a control that allows the user to indicate whether to change the state to online or offline. The user can change these values as desired and then can choose "OK" to apply the change or "Cancel" to reject the change and revert back to the state of the values before the dialog box was displayed.

Operate(ManagedEntity)—This function operates on the supplied managed entities in a window.

RequiredManagementInterfaces()—This function returns an array of strings that indicate what management interfaces this management Operation requires.

4) After loading the DLL and creating an "Online Management Operation" object, Administrator calls the "Configure" function to allow the user to change the default settings (step 108).

5) Once the user has modified the configuration of the "Online Management Operation" object, as desired, the next step is to execute the Operation. To do this, Administrator calls RequiredManagementInteraces (step 110). This function returns an array of strings. In the case Online Management Operation, the only management interface required is ChangeOnlineState.

6) Next, Administrator invokes the HasManagementInterface object on each ME to test whether the ME supports ChangeOnlineState (step 112). The MEs that support this MI are stored for future reference. If no particular managed entity or entities are selected, Administrator defaults to selecting all MEs that support the required MI.

7) Next, Administrator invokes the Operate method in the Online Management Operation object, passing it the array of MEs determined in 6 (step 114)

8) When the Operate method of the Online Management Operation object is invoked, the presence of the ChangeOnlineState MI is verified (by the Operate method) and a pointer to the ChangeOnlineState MI of each ME is stored. The ChangeOnlineState MI is retrieved by invoking GetManagementInterface method in each ME with the string "ChangeOnlineState" as an argument (steps 116, 118).

The "ChangeOnlineState" management interface has two functions:

Online()—This function changes the online state of the target ME to "online".

Offline()—This function changes the online state of the target ME to "offline".

9) The Operate method of the Online Management Operation object operates as follows (step 120). For each ME, either the Online() or Offline() function is called to set the appropriate state, depending on the value of the member variable (set earlier in the Configuration step).

Management Operations, similar to Management View, allows an operation to be performed on a collection of MEs (e.g. printers). Like Management Views, Management Operations can be shared amongst several management applications. Unlike Management Views, configured Management Operations lend themselves to reuse and scheduling. Accordingly, Management Operations can be stored for later use. Thus, rather than creating a new Management Operation object each time the Management Operation is used, a previously created Operation can be accessed and reused. To use a previously created Management Operation object, the user selects them from a special menu. The text for this menu can come from the object itself. For instance, the Management Operation object may possess a member function that enables the retrieval of an instance of a specific descriptive string. An Online Management Operation configured to set the availability state of a device to "online" has a descriptive string of "Set Online State to Online".

Similarly, Operations can be scheduled to occur. A configured Management Operation object is associated with a collection of MEs in order to be scheduled for execution at a predetermined time. This enables any arbitrary Management Operation object to be scheduled-regardless of whether or not the management application was designed with knowledge of the Management Operation or not.

Accordingly, Management Operations enable a manufacturer to develop extensions to existing management software, independent of the development of the management software. This is important because the group that develops products (such as printers) is often distinct from the group that develops management software and it is difficult to coordinate their development schedules.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling a user at a management computer to invoke a function on one or more of plural managed units (22,24) of a peripheral system, each managed unit providing one or more services for one or more client computers, each said service having an associated managed entity (ME) interface that includes reference(s) to one or more management interfaces (MIs), each MI comprising one or more method(s) for controlling a managed unit to execute a desired operation, said method comprising the steps of:
   in response to a user selecting an Operation object whose function is to cause execution of one or more actions by one or more of said managed units (22,24), executing said Operation object to:
   (i) determine which MEs associated with said managed units (22,24) support a designated MI object that will enable execution of said desired action, by invoking execution of a management interface provider object on each managed unit to return an answer with respect to an associated ME;
   (ii) pass a list of MEs, that were determined in step (i) to support such a designated MI object, to an Operate method whose task is to invoke said desired operation by causing execution of said designated MI on one or more of managed units (22,24) represented by said list of MEs;
   (iii) execute said Operate method to initiate execution of said designated management interface object, with respect to a managed unit associated with said one or more MEs on said list, said designated management interface object thereby causing performance of said desired action by said managed unit.

2. The method as recited in claim 1, wherein said Operation object is loaded as a plug-in to a currently operating application, which, in turn, enables execution thereof.

3. The method as recited in claim 1, wherein said management interface provider object includes: a method for determining if an ME has an associated MI object corresponding to said desired action; a method for retrieving said associated MI object; and a method for listing MI objects associated with an ME.

4. The method as recited in claim 1, wherein each said managed unit that includes a particular service manifests said service with a substantially identical ME interface.

5. The method as recited in claim 4, wherein each said managed unit that supports said action manifests said action with a substantially identical MI object.

6. The method as recited in claim 1, wherein said Operation object enables execution of plural functions, said method including the further step of:
   invoking a configure method supported by said Operation object to enable a user to revise an internal state of said Operation objects.

7. The method as recited in claim 1, wherein said Operation object enables execution of plural functions, said method including the further step of:
   invoking a required MI method supported by said Operation object to return a list of MI objects that are required for successful execution of said Operation object.

8. The method as recited in claim 1, wherein said Operation object enables execution of plural functions, said method including the further step of:
   invoking an Operate method supported by said Operation object to i) obtain a pointer to said designated MI object, and ii) retrieve said designated MI object by using said pointer and invoking a "get management interface" function on said one or more MEs that support said designated MI object.

9. The method as recited in claim 1, including the further steps of:
   retaining said Operation object subsequent to execution thereof, to enable its later reuse; and
   displaying a list of retained Operation objects in response to a user's query.

10. The method as recited in claim 1, including the further steps of:
    scheduling said Operation object to be executed with respect to one or more designated MEs at a subsequent time.

11. A memory media including code for controlling a processor to enable a user at a management computer to invoke a function on one or more of plural managed units of a peripheral system, each managed unit providing one or more services for one or more client computers, each said service having an associated managed entity (ME) interface that includes reference (s) to one or more management interfaces (MIs), each MI comprising one or more method(s) for controlling a managed unit to execute a desired action, said memory media comprising:
    a) means for controlling said processor to respond to a user selecting an Operation object whose function is to cause execution of one or more operations by one or more of said managed units, to cause said Operation object to:
    (i) determine which MEs associated with said managed units support a designated MI object that will enable execution of said desired operation, by invoking execution of a management interface provider object on each managed unit to return an answer with respect to an associated ME;
    (ii) pass a list of MEs, that were determined in step (i) to support such a designated MI object, to an Operate method whose task is to invoke said desired operation by causing execution of said designated MI on one or more of managed units represented by said list of MEs;
    (iii) execute said Operate method to initiate execution of said designated management interface object, with respect to a managed unit associated with said one or more MEs on said list, said designated management interface object thereby causing performance of said desired action by said managed unit.

12. The memory media as recited in claim 11, wherein code causes said Operation object to be loaded as a plug-in to a currently operating application, which, in turn, enables execution thereof.

13. The memory media as recited in claim 11, wherein said management interface provider object includes: a method for determining if an ME has an associated MI object corresponding to said desired action; a method for retrieving said associated MI object; and a method for listing MI objects associated with an ME.

14. The memory media as recited in claim 11, wherein each said managed unit that includes a particular service manifests said service with a substantially identical ME interface.

15. The memory media as recited in claim 14, wherein each said managed unit that supports said action manifests said action with a substantially identical MI object.

16. The memory media as recited in claim 11, wherein said Operation object enables execution of plural functions, said memory media further comprising:

means for controlling said processor to invoke a configure method supported by said Operation object to enable a user to revise an internal state of said Operation object.

17. The memory media as recited in claim 11, wherein said Operation object enables execution of plural functions, said memory media further comprising:

means for controlling said processor to invoke a required MI method supported by said Operation object to return a list of MI objects that are required for successful execution of said Operation object.

18. The memory media as recited in claim 11, wherein said Operation object enables execution of plural functions, said memory media further comprising:

means for controlling said processor to invoke an Operate method supported by said Operation object to i) obtain a pointer to said designated MI object, and ii) to retrieve said designated MI object by using said pointer and invoking a "get management interface" function on said one or more MEs that support said designated MI object.

19. The memory media as recited in claim 11, further comprising:

means for controlling said processor to retain said Operation object subsequent to execution thereof, to enable its later reuse; and means for controlling said processor to display a list of retained Operation objects in response to a user's query.

20. The memory media as recited in claim 11, further comprising:

means for controlling said processor to schedule said Operation object to be executed with respect to one or more designated MEs at a subsequent time.

* * * * *